May 2, 1933. F. S. MARCELLUS ET AL 1,906,476
OSCILLOGRAPH
Filed June 19, 1931
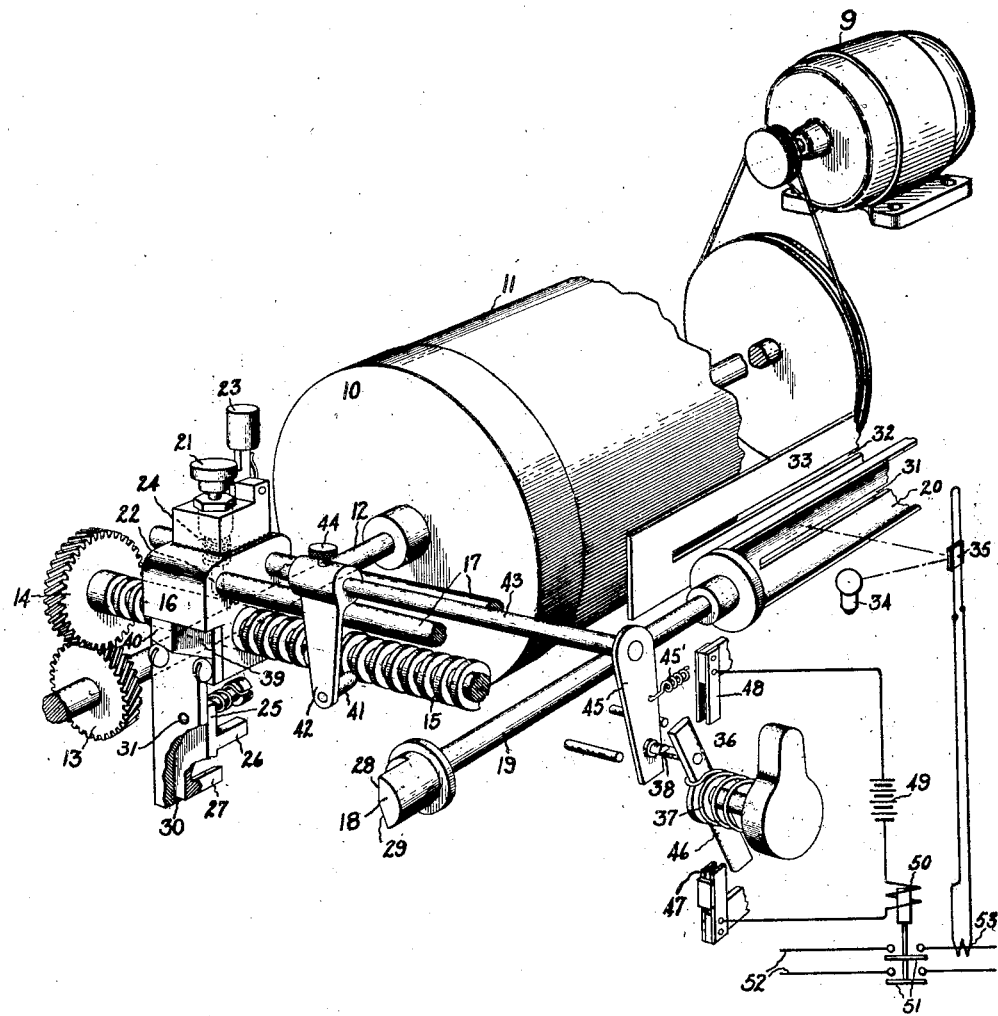
Inventors:
Fredrick S. Marcellus,
Merlin A. Rusher,
by Charles E. Tullar
Their Attorney.

Patented May 2, 1933

1,906,476

UNITED STATES PATENT OFFICE

FREDRICK S. MARCELLUS AND MERLIN A. RUSHER, OF SCOTIA, NEW YORK, ASSIGNORS TO GENERAL ELECTRIC COMPANY, A CORPORATION OF NEW YORK

OSCILLOGRAPH

Application filed June 19, 1931. Serial No. 545,598.

Our invention relates to certain new and useful improvements in oscillographs. As is well known to those skilled in the art, an oscillograph, such for example, as is shown in United States Patent 919,467 granted April 27, 1909 to L. T. Robinson, includes one or more galvanometer mirrors which oscillate responsive to electric phenomena. If a beam of light is thrown on such a mirror when it is oscillating, the reflected beam will also oscillate and if a photographic plate or film is moved with sufficient speed across the path of this reflected beam and at right angles to its direction of motion, the positions of the beam will be recorded, which will give a permanent record of the phenomena. In order to prevent the light from affecting the film except when it is desired to make records, a shutter is ordinarily interposed between the film and the source of light. The film is divided into sections to effect an economic utilization of the film. These sections may be real or may be composed of a definite portion of an entire film, such portion for example as may be equal to the circumference of the drum on which the film is wound.

Our invention consists in part of a particular mode of controlling the shutter of an oscillograph so that it will be opened when the beginning of a section of a film reaches it and will remain open during the interval of time that this section is moving past the shutter opening. Another part of our invention consists of controlling the starting of the phenomena to be observed so that the shutter has just been opened at the time that the phenomena start oscillating the mirrors. This insures that the film will be receiving light and ready to record at the proper time and also prevents a waste of film.

A better understanding of the invention can be had and further objects of the invention will appear from the following specification taken in connection with the accompanying drawing which is a schematic embodiment of our invention and the scope of the invention will be pointed out in the appended claims.

In order to secure the proper co-ordination between the film and the shutter, the most logical way to proceed is to have the shutter and the film operated by the same mechanism. The method of doing this in our invention can be understood by referring to the drawing in which the motor 9 moves the drum 10 around which the film 11 is fastened in any well known manner. The drum 10 controls the shutter shaft 19 and consequently the shutter, by means of an arrangement which will now be described in detail. The drum 10 is provided with an extension shaft 12 to which is attached gear 13 and with which is meshed gear 14, to which gear and integral with it is attached worm shaft 15. On worm shaft 15 is mounted movable carriage 16 which is provided with a circular opening so as to surround said worm shaft. Carriage 16 is slidably mounted on supporting members 17 which members are so positioned that said carriage can move against cam 18 on the shutter shaft 19 and thus control the shutter 20. The carriage is provided with a pin member 21 which is so located that, when in its innermost position, its point 22 fits into the groove of the worm shaft 15. The direction of rotation of worm shaft 15 is such as to carry carriage 16 to the right when pin 21 meshes with the worm. During the period of non-recording this point 22 is held out of operation with the worm shaft by means of retaining member 23. This is done against the force of spring 24 which tends to push point 22 into the groove of the worm 15. To procure the proper cooperation between the movement of this carriage and shutter 20, we have provided the lower extremity of this carriage 16 with a movable part 25 on which are abutments 26 and 27, the latter below and behind the former. These abutments are so designed that as the carriage moves toward the cam 18, the upper one 26 comes in contact with part 28 of the cam 18 which rotates the shutter 20 in one direction, and this is subsequently followed by the lower abutment 27 coming in contact with part 29 of the cam 18 which rotates the shutter in the opposite direction. Movable member 25 on which abutments 26 and 27 are located cannot move with respect to the carriage as carriage 16 approaches cam 18 because of backing plate 30, but as the carriage is returned to its original position member 25 can move about its pivot 31 in a counter-clockwise direction and allow abutments 26 and 27 to slide over cam 18 without rotating the shutter shaft. Shutter 20 is provided with a slot 31 which slot has its counterpart 32, in member 33 which is disposed in close proximity to film 11. When openings 31 and 32 are in alignment light from lamp 34 is reflected from the galvanometer mirror 35 thru the openings 31 and 32 and on the film 11. Only one galvanometer mirror is shown and the field structure of the galvanometer is omitted from the drawing.

In order to correlate the starting of the phenomena to be recorded and the opening of the shutter 20 a transient control switch 36 is employed which is held open against the tension of a spring 37 by means of a latch 38 but the closing of which is dependent on the movement of carriage 16 along the worm shaft 15. The method of accomplishing this is by providing carriage 16 with a bevelled portion 39 which, as the carriage moves toward the cam 18, slides under a pin 41 of lever arm 42 forcing this lever arm outward. This lever arm is slidably mounted on shaft 43 but is securely held in a given position by set screw 44 and consequently as said lever arm moves outward it rotates shaft 43. To this shaft 43 is attached arm 45 on which is mounted half of the catch 38. The shaft 43 is normally held in the position shown by a spring 45'. As the shaft rotates it allows catch 38 to disengage which permits spring 37 to rotate bridging member 46 in a clockwise direction across contacts 47 and 48. In the present illustration the closing of contacts 47 and 48 completes the circuit of a contactor coil 50 thru the battery 49, causing the coil to pick up the contacts 51 and close the line 52. The closing of line 52 excites the current transformer 53 which in turn brings about oscillations of the mirror 35 responsive to the conditions of the circuit. The carriage 16 is provided with bevelled portion 40 which allows it to slide under pin 41 when it is returned to its original position. Any other switching operation desired may be controlled by this switch and additional contacts may be added as conditions warrant.

The operation of our above described device will be obvious to those skilled in the art by the foregoing description but for the purpose of rendering the description complete, we shall describe the operation as follows.

For the purposes of simplicity, we shall assume that the film is divided into sections each of which is equal in length to the circumference of the drum 10. The motor is started which rotates the drum 10 and the worm shaft 15. Retaining member 23 is disengaged from pin member 21 allowing the spring 24 to force point 22 into the groove of worm shaft 15. Since this shaft 15 is rotating, pin 21 and consequently carriage 16 to which the pin is fastened, will follow the groove toward the cam 18. As the carriage reaches this cam, abutment 26 strikes part 28 of the cam 18 and rotates cam shaft 19 so that opening 31 of shutter 20 is in alignment with opening 32 of member 33, thus allowing the light reflected from the mirror 35 to strike the film 11. Abutment 27 on carriage 16 is so positioned with respect to 26 that it will allow shutter 20 to remain open until a section of film 11 has passed whereupon it comes in contact with part 29 of cam 18, and rotates the shaft 19 so as to close the shutter. To return the carriage to its starting position raise pin member 21, in which position it will be held by retaining member 23. Then slide the carriage back to its starting position which can be accomplished without any difficulty since abutments 27 and 26 are attached to member 25, which member can move in a counter-clockwise direction about pivot 31, thus allowing abutments 26 and 27 to slide over cam 18. These resetting operations are performed by hand.

The operation of the transient control switch in case it is desired to record controllable phenomena is regulated in timed relationship with the opening of the shutter 20. Under normal conditions the bridging member 46 is held in its open position against the tension of spring 37. The lever arm 42 is moved to the desired position on shaft 43 and securely fastened by means of set screw 44. This position will be determined empirically and will ordinarily be such that the contacts 51 are picked up and the mirror will begin to oscillate at the time that the shutter 20 is first opened, although by adjusting arm 42 along shaft 43 the switch 54 may be closed just before or just after the opening of the shutter as desired. As the carriage 16 moves toward the cam 18, the bevelled portion 39 slides under pin 41 of lever arm 42, causing lever arm 42 to move outward and disengage catch 38. Bridging member 36 completes the circuit of battery 49 and contactor coil 50 thru contacts 47 and 48. Coil 50, being excited, picks up contacts 51, closing the line 52. Closing of the line excites current transformer 53 and the mirror is caused to vibrate in accordance with the current flowing in circuit 52. At the time lever arm 42 was raised by carriage 16, this carriage was still moving toward cam 18 and as described above the abutments on this carriage open shutter 20. In the operation of the combination of the transient control switch 36 and the shutter 20 the shutter may be opened at exactly the same time that the mirror 35 begins to oscillate. The closing of the shutter takes place as above described.

The bevelled portion 40 on carriage 16 allows the carriage to slide under lever arm 42 in the return of the carriage to its normal position. To again set the transient control switch it is merely necessary to turn bridging member 46 by hand so that the latch 38 engages.

While we have described a particular embodiment of our invention, and certain apparatus for carrying out our method, it will be obvious to those skilled in the art that various modifications may be made without departing from the spirit of our invention and we therefore desire to cover all such modifications as fall within the scope of our invention by the appended claims.

What we claim as new and desire to secure by Letters Patent of the United States, is:

1. In an oscillograph having a film and a film moving means, a shutter provided with a cam which shutter is open during predetermined intervals of travel of said film and means for controlling said shutter operated by said film moving means comprising a worm shaft on which is mounted a movable carriage and which carriage is provided with abutments, the latter being so located that they are in operative relationship with said cam.

2. In an oscillograph having a film moving means, a shutter provided with a cam mounted on a cam shaft, and means operated by said film moving means to operate said shutter in timed relationship to said film-moving means, said means operated by said film-moving means comprising a worm on which is movably mounted a carriage, said carriage being provided with abutments which abutments are located in operative relationship to said cam.

3. In an oscillograph having a film moving means, a shutter provided with a cam shaft on which is mounted a cam, means operated by said film moving means to operate said shutter in timed relationship to said film-moving means, said means comprising a worm on which in operative relationship with it is provided a carriage, said carriage having attached thereto abutments which are located in operative relationship to said cam.

4. In an oscillograph having a film and a film-moving means, a shutter to which is fastened a cam, a circuit controlling means, and a single means operated by said film moving means to operate said circuit controlling means, said film and said shutter in timed relationship, said means including a movable carriage which is located in operative relationship to said cam.

5. In an oscillograph having a film and film-moving means, a shutter, circuit controlling means comprising contacts, a bridging member adapted to bridge said contacts which bridging member is held in its normal position by means of a latch, the latter being connected to a latch controlling means, and means operated by said film moving means to operate said film, said shutter and said circuit controlling means in timed relationship, said means including a worm on which is mounted a carriage movable in operative relationship with said latch controlling means.

6. In an oscillograph having a film-moving means, a shutter operating means, a circuit controller, and a single means actuated by the film-moving means for operating the circuit controller and the shutter operating means in timed relationship to the movement of the film moving means.

In witness whereof, we have hereunto set our hands.

FREDRICK S. MARCELLUS.
MERLIN A. RUSHER.